United States Patent [19]
Becker et al.

[11] 3,909,202
[45] Sept. 30, 1975

[54] APPARATUS FOR ANALYSIS OF LIQUIDS

[75] Inventors: Wolf-Jürgen Becker; Franz-Josef Schulte, both of Leverkusen; Klaus Siemer, Schildgen, all of Germany

[73] Assignees: Bayer Aktiengesellschaft, Leverkusen; Erdolchemie Gesellschaft mit beschrankter Haftung, Cologne, both of Germany

[22] Filed: Dec. 5, 1973

[21] Appl. No.: 422,059

[30] Foreign Application Priority Data
Dec. 15, 1972  Germany............................ 2261449

[52] U.S. Cl. ....................... 23/253 PC; 23/230 PC
[51] Int. Cl.² .................. G01N 25/24; G01N 31/12
[58] Field of Search ...... 23/230 PC, 253 PC; 73/23, 73/23.1, 25

[56]           References Cited
          UNITED STATES PATENTS
3,205,045   9/1965   Von Lossberg................. 23/230 PC 3,304,159   2/1967   Hinsvark........................ 23/230 PC
3,475,131   10/1969   Keulemans..................... 23/230 PC
3,607,076   9/1971   Paine............................. 23/253 PC

*Primary Examiner*—R. E. Serwin
*Attorney, Agent, or Firm*—Burgess, Dinklage & Sprung

[57]                 ABSTRACT

Apparatus for the analysis of liquids comprising a combustion furnace comprising several combustion chambers arranged one inside the other, whereby the sample mixed with a carrier gas flows repeatedly through the hottest zone of the furnace, an injection valve through which the liquid to be analysed continuously flows and which injects the liquid into the combustion furnace, and an analyser connected to the outlet of the combustion furnace.

7 Claims, 5 Drawing Figures

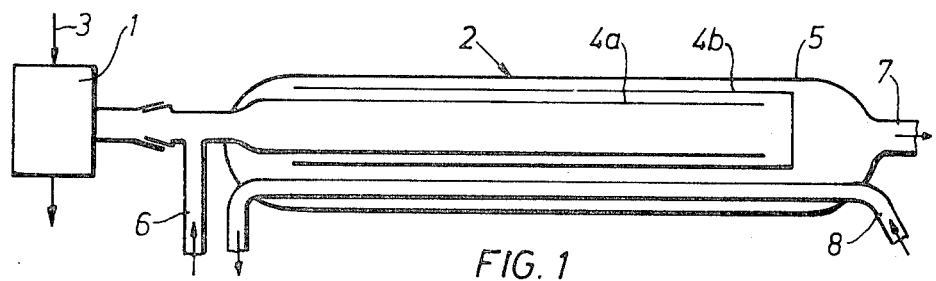
FIG. 1
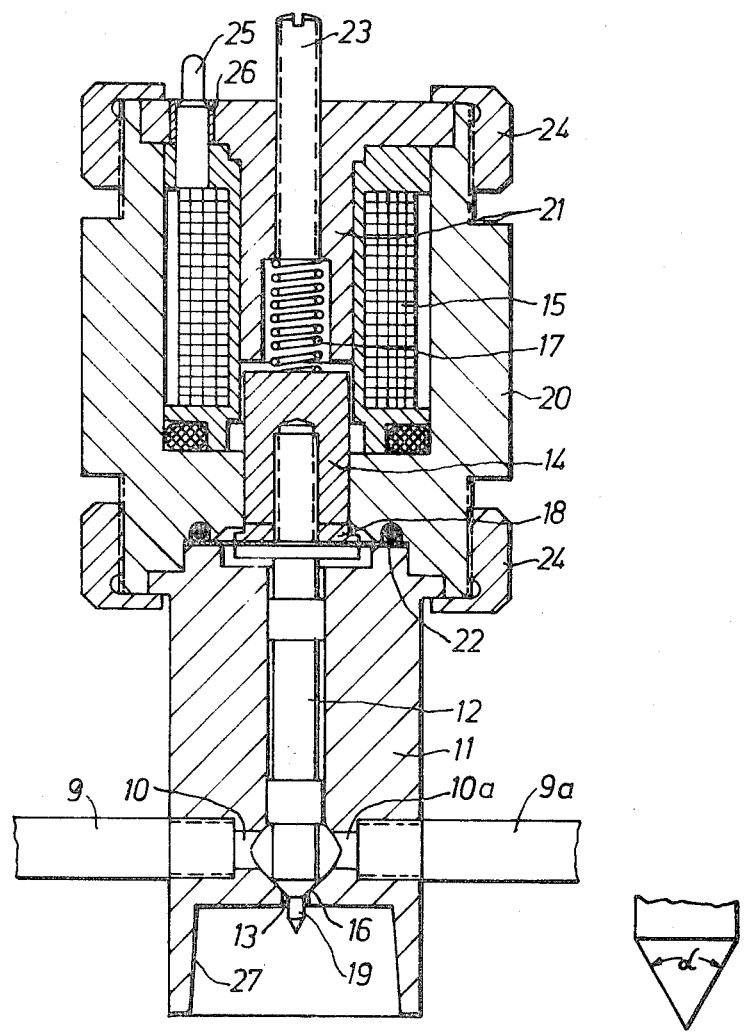
FIG. 2
FIG. 3

APPARATUS FOR ANALYSIS OF LIQUIDS

This invention relates to an apparatus for the analysis of liquids varying in their composition.

In the analysis of liquids, a specific quantity of liquid has to be injected into the combustion furnace. In the most simple case, microliter injectors are used for this purpose. Difficulties arise when the composition of the liquid to be analysed varies as a function of time. In this case, sampling is no longer representative of the true state of the liquid to be analysed. For this reason, automatic microliter injectors, reciprocating pumps or the flat slide valves commonly used in gas chromatography have already been proposed for dosage. Since, in all these dosage systems, the liquid so to speak forms up at the dosing feeder and does not flow past the dosing orifice, prolonged dead times cannot be avoided here either.

In addition, continuous-dosage tests have been conducted with rotary cocks. For some years now rotary cocks have been successfully used for gas dosage. Unfortunately, their machining and accurate alignment of the bores involves considerable difficulties. In addition, wetability is governed to a very considerable extent upon the type of test liquid. Tiny droplets remain adhering to edges and grooves so that accurate dosage is not possible. In all the dosage systems described so far, the sample is carried into the analyser by a foreign medium (for example air, piston, etc). Direct, continuous dosage by means of capillaries can only be carried out with extremely pure liquids because a constant throughflow rate must be guaranteed. The relatively long dead time is a disadvantage in this case, too, because the volume of liquid before the capillary is generally relatively large by comparison with the dosed volume.

Surprisingly accurate and reproducible dosage can be carried out by means of injection valves. In principle, valves of this kind have already been used in the motor vehicle industry for fuel injection purposes. However, the numerous tests which we have conducted have shown that, even with these valves, reproducibility of the results of analysis is far from satisfactory. Although dosage is extremely accurate, combustion clearly differs from one liquid particle to an other. In many cases, combustion of the sample is incomplete. Since it is not possible in principle to obtain constant injection into a combustion furnace as a function of the solid angle with different samples and carrier gas streams, an attempt had to be made to find a new method.

Accordingly, the object of the invention is to provide an system in which sampling is automatic and which gives accurate, reproducible results, especially in the case of liquids varying in composition as a function of time. One of the conditions in this respect is that combustion should always be complete irrespective of the injection parameters (for example carrier-gas velocity, liquid pressure).

According to the invention, there is provided an apparatus for the analysis of liquids comprising a combustion furnace comprising several combustion chambers arranged one inside the other, whereby the sample mixed with a carrier gas flows repeatedly through the hottest zone of the furnace, an injection valve through which the liquid to be analysed continuously flows and which injects the liquid into the combustion furnace, and an analyser connected to the outlet of the combustion furnace.

Air is generally used as the carrier gas. In cases where the total carbon content of liquids is determined by pyrolysis, the carrier gas should not contain any carbon. Accordingly, the gaseous carbon dioxide in the air used as carrier gas and any hydrocarbon compounds present are best removed by precombustion and $CO_2$-adsorption. In one advantageous embodiment of the invention, therefore, the combustion furnace is provided with an additional combustion chamber for precombustion of the carrier gas.

In automotive fuel-injection valves, the fuel does not flow through the valve, but is introduced under pressure. If this type of valve were to be used for analytical purposes, unacceptable dead times would occur. Apart from this, the material from which automotive fuel-injection valves are made is unsuitable for corrosive liquids. Accordingly, conventional injection valves have to be modified for this special purpose. The redesigned injection valve advantageously consists of a valve needle, axially displaceable in a valve housing, which opens and closes an annular gap in the valve housing. The liquid-flow guide is designed in such a way that the liquid to be analysed flows through the annular gap. The valve needle is driven in the usual way by an electromagnet. However, it is important in this respect for the electromagnet to be separated from the liquid-carrying part of the valve by an elastic membrane. It is only in this way that corrosion of the electrical components can be avoided.

In one preferred embodiment of the valve, the valve needle terminates in a cylindrical plug with a tapered end. The taper angle $\alpha$ should be less than 60°, preferably 45°.

In a further development of the invention, the injection valve is preceded by a pump and an equalising volume and followed by a pressure controller with an adjusting valve. In this way, a constant pilot pressure is obtained at the injection valve.

By virtue of the invention, it is possible to carry out accurate and reproducible analyses of flowing liquids whose composition gradually changes as a function of time. By virtue of the special design of the valve, sampling is largely representative of the true state of the liquid being analysed. The particular construction of the combustion furnace guarantees complete combustion in every case. Another advantage of the new combustion apparatus is the fact that it can be universally used. It is suitable for determining total carbon content and total oxygen demand and equally suitable for analysing heavy metals in liquids. One special field of application for the invention is the analysis of effluents such as sewage.

One embodiment of the invention is described by way of example in the following with reference to the accompanying drawings, wherein:

FIG. 1 shows the combustion furnace with the injection valve.

FIG. 2 shows the injection valve.

FIG. 3 shows the tip of the valve needle.

Figure 4:
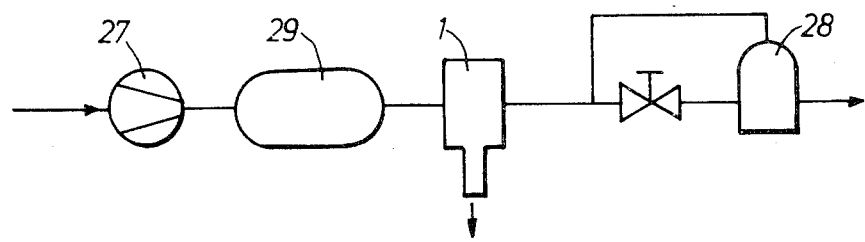
FIG. 4 is a block diagram showing the delivery of test liquid to the injection valve.

As shown in FIG. 1, the injection valve 1 is directly connected to the combustion furnace 2. The sample 3 to be analysed flows through the injection valve 1. The combustion furnace 2 consists of two tubes 4a, 4b arranged one inside the other and surrounded by the outer shell 5. The carrier gas inlet pipe 6 is connected to the inner tube 4a. The hottest zone of the combustion furnace 2 is substantially at the centre. By means of the diverting tube 4b, the carrier gas charged with the injected sample flows three times through the hottest zone. In this way, complete combustion of the injected sample is ensured. The gaseous products of combustion formed are delivered to the analyser through the outlet opening 7.

In many cases, the carrier gas is air. In order to remove the carbon constituents from it, the air is subjected to precombustion and then to $CO_2$-adsorption. For this purpose, the furnace 2 may be equipped with an additional combustion chamber 8. The carrier air is guided through this combustion chamber 8 and the $CO_2$ formed subsequently removed. The furnace as a whole may be made of quartz. It may be electrically heated to 1000° – 1200°C. The temperature may be kept constant by means of a control circuit.

FIG. 2 shows the injection valve 1 in detail. The liquid to be analysed is introduced into the valve under an excess pressure of 0.5 to 1.0 bar, and flows continuously through the valve through inlet 9 and bore 10 in a valve housing 11. The liquid enters the valve housing 11 at the tip of the valve needle 12 so that the tip of the valve needle is directly flushed by the liquid. The liquid leaves the valve housing on the opposite side at outlet 9a, through outlet bore 10a. This arrangement allows sampling which in every practical case is representative of the actual state of the liquid to be analysed. The shortest time interval between two successive analyses is of the order of two minutes. This dead time is necessary for the combustion furnace to be flushed after each injection. The construction of the injection valve would allow even shorter intervals.

The valve needle 12 is mounted for axial displacement in the valve housing 11. An annular gap 13 between the valve needle 12 and the valve housing 11 provides an outlet for discharge of samples from the liquid stream passing through bore 10 which opens when an armature 14 is attracted by a magnetic field generated in an electromagnetic coil 15. When the electrical current is cut off by the coil 15, the annular gap 13 at the cut-away edge 16 is automatically closed by the spring force of a closing spring 17. The volume injected (at least approximately 5 $\mu$l) is determined both by the opening time of the valve needle 12 and by the excess pressure of the liquid. Under the preferred working conditions of 0.5 bar excess pressure and 20 $\mu$l sample volume, the opening time amounts to around 10 $m$ sec. The valve needle 12 preferably has a lift of about 0.15 mm. The lift can be adjusted by grinding the disc 18.

In order to obtain tight seating of the valve needle 12, it is provided at its lower end with a conical transition section and a cut-away edge 16. This cut-away edge is formed from two frustums with cone angles of 75° and 105°, respectively. The valve housing 11 has a conical bore with a cone angle of 90°. The cut-away edge 16 is seated on this bore when the valve is closed.

At its end, the conical transition section of the valve needle 12 terminates in a cylindrical plug 19 which projects from the valve housing 11. The annular gap 13 is formed between a bore in the valve housing 11 and the plug 19 of the valve needle 12. The bore in the valve housing preferably has a diameter of 1.15 mm and a length of 0.5 mm. The cylindrical plug 19 preferably has a diameter of 1 mm and a length of 2 mm. It is longer than the bore in the valve housing and, for this reason, always projects beyond the outer edge of the bore, even when the valve is closed. This ensures that the liquid is able to flow out of the valve with hardly any reaction. Since premature spraying is undesirable, the plug 19 of the valve needle terminates in a conical tip. The angle $\alpha$ of the conical tip should be less than 60°, and it is preferably 45°.

The coil housing 20, the coil support 21 and the armature 14 are made of soft-magnetic steel. However, soft-magnetic steels are not resistant to corrosive liquids, for example effluents contaminated with organic matter in the chemical industry. For this reason, the coil housing 20 is separated off from the liquid-carrying valve housing 11 by a corrosion-resistant membrane 22. The membrane may be made of polytetrafluorethylene (PTFE). The membrane 22 is held between the armature 14 and a ring on the valve needle 12 and between the coil housing 20 and the valve housing 11. In this way, the valve needle 12 remains freely movable. The armature 14 has an internal thread and can be screwed onto the screw thread of the valve needle 12, simultaneously fixing the membrane 22. All parts which come into contact with the liquid to be analysed (i.e. the valve housing 11, the valve needle 12, the inlet and outlet pipes 9 and 9a) have to be resistant to this liquid. In addition, the valve housing 11 and the valve needle 12 have to show high notched-impact strength. For dosing corrosive chemical effluents, highly alloyed steels are used as starting material.

The initial tension of the closing spring 17 can be adjusted by means of the screw 23. It is possible in this way to vary both the return force of the spring 17 and hence the closing pressure of the valve needle 12.

The valve housing 11 is screwed firmly to the coil support 21 and coil housing 20 by means of retaining nuts 24. This method of fixing provides for simple dismantling in order to clean the injection valve or to replace defective components. The current leads 25 for the coil 15 are situated at the upper end of the valve. They are guided through the coil support 21 by means of the insulating bushes 26.

The valve is standard-ground at its lower end 27 and is directly fitted onto the corresponding counterpart of the combustion furnace 2 at this standard-ground lower end as shown in FIG. 1.

Delivery of the sample liquid to the injection valve is illustrated in FIG. 4 which shows an application of the injection valve in automatic effluent analysis systems. The effluent should be as free from solids as possible because solid particles can interfere with operation of the injection valve 1. Solids can be removed from the effluent by filtration or centrifuging. It has proved to be of advantage to use a gear pump 27 for generating a suitable pilot pressure for the injection valve 1. A pressure controller 28 with an adjusting valve acts as a throttle and keeps the liquid excess pressure at the valve 1 constant. A buffer volume 29 is provided between the valve 1 and the pump 27 in order to neutralise pressure surges of the pump.

Figure 5:
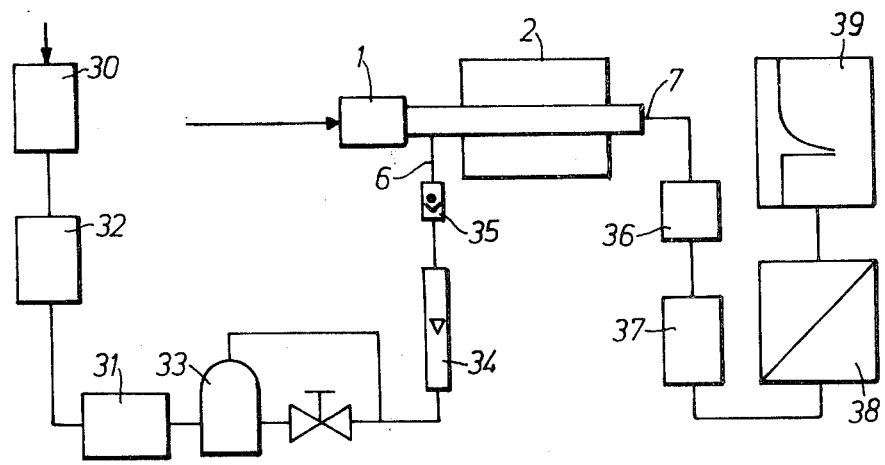
FIG. 5 is a block diagram for applications where the analysis system is used for determining the total carbon content of a sewage sample.

One application of the invention is shown by way of example in FIG. 5. FIG. 5 is a block diagram for pyrolytic determination of the total carbon content of a sewage sample. The most important part of the system is the combustion furnace 2 with the injection valve 1. Air is used as the carrier gas. The air preparation unit is connected to the carrier gas inlet 6. The outlet opening 7 of the combustion furnace 2 is connected to a detector unit through various filters.

In the air preparation unit, the gaseous carbon dioxide present in the carrier air and any hydrocarbon compounds present (oil mist etc) is completely removed except for a small constant residue. The air preparation unit consists essentially of zeolite adsorbers 30 and 31 and a precombustion chamber 32 arranged between them. The precombustion chamber 32 consists of a tube 8 arranged in the combustion furnace 2. An airstream of 10 to 30 liters per hour is adjusted by means of a combined pressure controller and adjusting valve 33 and a flow meter 34. A non-return valve 35 between the flow meter 34 and the carrier gas connection 6 prevents the combustion gases from flowing back and the water vapour from condensing in the flow meter 34.

Approximately 20 $\mu l$ of sewage are injected into the inner tube 4a of the combustion furnace 2 by means of the injection valve 1. The hydrocarbon compounds present in the sewage are then completely burnt at around 1000° to 1200°C to form carbon dioxide. Complete combustion is obtained both by the high temperatures and by the repeated circulation of the carrier gas charged with the sample through the combustion furnace 2 (cf. FIG. 1). An increase in temperature to beyond 1200°C does not bring about any increase in the yield of $CO_2$.

The $CO_2$ formed flows through a washing bottle 36 filled with calcium chloride granulate and a dust filter 37 to the $CO_2$-meter 38. The washing bottle 36 is used to absorb any water vapour still present. Since the carrier gas is extremely dry, some of the water vapour absorbed is slowly given off again between two injections of effluent. The dew point of the measuring gas is lowered to such an extent that water vapour is prevented from condensing in the following pipes and equipment.

Suitable $CO_2$-analysers are commercially available (for example the Uras 2-type manufactured by Messrs. Hartmann & Braun AG, Frankfurt, or the Unor 2-type manufactured by Maihak AG, Hamburg). The individual carbon dioxide concentrations are recorded by the recorder 39. Both are integrated total carbon dioxide concentration and also the maximum carbon dioxide concentration can serve as measures of the carbon content of the water. As already mentioned, the shortest interval between two successive analyses is approximately 2 minutes. This interval is necessary for flushing the carbon dioxide formed out of the combustion furnace.

What we claim is:

1. An apparatus for the analysis of samples of a liquid comprising:
   a. a combustion furnace comprising several tubes arranged one inside the other for passage of the sample serially through the tubes, during the combustion,
   b. an injection valve having a bore for continuous flow of a stream of the liquid through the valve, an outlet for discharge of the sample from the stream, means for opening and closing said outlet for the discharge of the sample, the injection valve being connected to the combustion furnace for injection of the sample into the combustion furnace,
   c. a carrier gas inlet pipe connected to the combustion furnace for introducing the carrier gas into the furnace so that the carrier gas carries the sample through the combustion furnace,
   d. an analyzer connected to the outlet of the combustion furnace.

2. An apparatus as claimed in claim 1, wherein the combustion furnace has an additional combustion chamber for precombustion of the carrier gas.

3. An apparatus as claimed in claim 1, wherein the injection valve comprises a valve needle axially displaceable in a valve housing, which needle opens and closes an annular gap in the valve housing, which forms said outlet and through which the sample flows for said injection, wherein the valve needle is connected to an electromagnet which is separated from the liquid-carrying part of the valve by an elastic membrane.

4. An apparatus as claimed in claim 3, wherein the valve needle terminates in a cylindrical plug with a tapering end whose taper angle $\alpha$ is less than 60° preferably 45°.

5. An apparatus as claimed in claim 3, wherein the injection valve is preceded by a pump and an equalising volume and followed by a pressure controller with an adjusting valve which keeps the excess pressure at the injection valve constant.

6. An apparatus as claimed in claim 4, wherein the injection valve is preceded by a pump and an equalising volume and followed by a pressure controller with an adjusting valve which keeps the excess pressure at the injection valve constant.

7. An apparatus as claimed in claim 1, wherein the injection valve is preceded by a pump and an equalising volume and followed by a pressure controller with an adjusting valve which keeps the excess pressure at the injection valve constant.

* * * * *